United States Patent [19]

Scherzer et al.

[11] 4,297,325

[45] Oct. 27, 1981

[54] METHOD OF PRODUCING PSEUDOBOEHMITE FROM ALUMINUM SALT SOLUTIONS

[75] Inventors: Julius Scherzer, Anaheim; Anh-Thu Liu, Santa Ana; Yih-Yau Sun, Montebello, all of Calif.

[73] Assignee: Filtrol Corporation, Los Angeles, Calif.

[21] Appl. No.: 214,215

[22] Filed: Dec. 8, 1980

[51] Int. Cl.$^3$ ............................................. C01F 7/34
[52] U.S. Cl. .................................. 423/122; 423/127; 423/625; 423/628; 423/631; 252/317
[58] Field of Search ............... 423/625, 628, 629, 631, 423/122, 127; 252/317

[56] References Cited

U.S. PATENT DOCUMENTS

| | | | |
|---|---|---|---|
| 2,416,508 | 2/1947 | Barnes et al. | 423/122 |
| 3,104,944 | 9/1963 | Hayes | 252/317 |
| 3,105,739 | 10/1963 | Hayes | 252/317 |
| 3,111,382 | 11/1963 | Hayes | 423/628 |

FOREIGN PATENT DOCUMENTS 1271097  6/1968  Fed. Rep. of Germany ...... 423/122

*Primary Examiner*—Herbert T. Carter
*Attorney, Agent, or Firm*—Philip Subkow; Bernard Kriegel

[57] ABSTRACT

The production process for pseudoboehmite from leach liquors produced in the acid treatment of clays, which liquors contain Fe and alkaline earth ions.

7 Claims, No Drawings

METHOD OF PRODUCING PSEUDOBOEHMITE FROM ALUMINUM SALT SOLUTIONS

Pseudoboehmites have become an important component of cracking catalysts containing faujasite type zeolites. In order to be suitable for such purposes, they are selected to have properties which include peptization index of less than sixty (60) (as hereafter described). Certain of us have discovered methods for obtaining such pseudoboehmites from aluminum salts such as aluminum sulfate (see copending U.S. Application Ser. No. 173,064.

One source of aluminum sulfate which has heretofore been not only an economic waste product but an ecological problem has been the waste product from the acid treatment of clays. Such process has been carried out over many years in the production of catalysts and adsorbants employing the acid treated clays. Aluminosilicate clays such as the kaolins, for example halloysite and the subboehmites, are leached with hot acid, for example, sulfuric acid. (See for example, U.S. Pat. Nos. 2,410,436, 2,935,463, 3,925,463 and 3,962,135.) The leach liquor contains salts of the alkaline earth and iron ions. In addition, the acid leaches aluminum from the alumino-silicate.

As described in said U.S. Pat. No. 2,935,463, the aluminum hydrate produced from ammonium alum derived from a clay leach solution is composed of a mixture of boehmite and alumina trihydrates. The form of the alumina hydrates which have been found desirable for incorporation into the matrix of a faujasite type catalyst is the pseudoboehmite substantially free of alumina trihydrate (see Secor, et al. U.S. Pat. No. 4,010,116).

In order to be useful for purposes of inclusion as a component of the matrix of the faujasite type catalyst, it is desirable not only that the alumina be a pseudoboehmite of the above peptization index but also that it be substantially free of the iron as oxide under about 1% of the pseudoboehmite on a volatile free basis, and substantially free of alkaline earth cations, i.e. less than 0.1% as oxides. These ions accompany the aluminum in the leach solution.

STATEMENT OF THE INVENTION

We have been able to produce pseudoboehmite of sufficiently low iron content, that is less than about 1% of the alumina (on a volatile free basis) and substantially free of alkaline earth ions from solutions of aluminum sulfate containing the sulfates of such cations. Such solutions are produced by the leaching of clays as described above.

We have been able to produce pseudoboehmite of purity and physical properties suitable for incorporation into the matrix of a zeolite catalyst in the form of spray dried microspheres of desirable catalytic activity and attrition resistance.

The alumina produced by our process from the reaction product of the acid leaching of clays (hereinafter referred to as leach solution) have peptization indexes of less than 60 minutes and yield zeolitic catalysts of desirable five (5) hour attrition index (see Secor, et al., U.S. Pat. No. 4,010,116, above).

The process of our invention includes the step of reducing the ferric ion present in the leach solution to the ferrous state and adjusting the pH to gel the alumina hydrate while leaving the other metal ions in the resultant leach solution. The gel is separated from the mother liquor and washed substantially free of the above ions.

The resultant gel is aged in an alkaline solution to generate the crystalline pseudoboehmite.

While other reducing media may be used which will reduce the iron from the ferric to the ferrous state without precipitating the iron or the alkaline earth cations, we prefer to employ a thiosulfate, for example sodium thiosulfate as the reducing agent.

The leach solution which is highly acid is adjusted in pH to protect the thiosulfate but to keep the solution sufficiently acid to promote the reduction of the ferric sulfate to ferrous sulfate in a reasonable period of time while keeping the salts of the other ions, for example the ferrous and alkaline earth ions in solution.

A pH in the range of from about 1 to about 3 and preferably in the range of about 1.5 to about 2.5 pH have been found suitable. The thiosulfate is employed in amount in excess of stoichiometric, for example, in excess of two moles of $Na_2S_2O_3$ per gram atom of Fe in solution, for example about 2.2 to about 2.5 moles.

The resultant solution is then further adjusted in pH of about 4 to about 5 employing an alkaline solution in concentration to precipitate the alumina monohydrate without precipitating any hydrate of the other ions, particularly the iron or the alkaline earth ions.

We have found that $NaOH$, $NH_4OH$, or $(NH_4)_2CO_3$ are suitable hydrolyzing agents for the precipitation of the alumina hydrate. By controlling the concentration of the $NH_4OH$ solution (less than about 10% by weight of $NH_3$ in the ammonia solution, preferably between about 4% and 5% by weight of $NH_3$) and in the case of the $(NH_4)_2CO_3$ or $NaOH$ solution (less than about 20% by weight of $(NH_4)_2CO_3$ or $NaOH$ in the solution), we may precipitate the alumina monohydrate gel substantially free of Ca, Mg or Fe cations.

We prefer to precipitate the alumina at a pH in the range of about 4.5 to about 5. The gel is separated from the mother liquor and washed to remove contaminating salts. The washed alumina hydrate is mixed with $NH_4OH$ solution at a pH of at least 9 and preferably higher, for example 10, and aged in the ammonium solution.

We may age it either under quiescent conditions or by refluxing as described in the copending application, Ser. No. 173,064 (Attorney's Docket No. 5585).

The pseudoboehmite produced by the above procedures has a peptization index of substantially less than 60 and may be formed to have peptization indexes of less than 10. They are substantially free of iron (calculated as $Fe_2O_3$) that is less than 1% and less than 0.1% of the oxides of the alkaline earth ions. They are suitable for use in the matrix of fluid catalytic cracking catalysts such as in formulations employed in the prior art, for example see the above copending applications filed with some of us as applicants and assigned to the assignee of this application. The applications cited above are incorporated into this application by this reference.

The following is our presently preferred embodiment of our invention and the best mode known to use.

EXAMPLE I

A solution formed by sulfuric acid leaching of Cheto clay (See U.S. Pat. No. 3,410,436) had the following compositons:

| | | |
|---|---|---|
| Al$_2$O$_3$ | = | 3.46% |
| Fe$_2$O$_3$ | = | 0.29% |
| MgO | = | 0.98% |
| CaO | = | 0.03% |
| SO$_3$ | = | 13.50% |

To this solution was added NH$_4$OH solution (concentration 4.3% of NH$_3$ by weight) sufficient to bring the pH to about 2.5. Sodium thiosulfate solution was then added in amount equal to about 120% of the stoichiometric equivalent to the Fe in solution, i.e. about 2.4 moles per Fe$^{+++}$.

The pH of about 2.5 was chosen so as to protect the thiosulfate but to provide for a practical reaction time. On addition of the thiosulfate a deep purple color develops which disappears to a colorless solution indicating the end of the reduction period. Ammonium hydroxide solution (4.3% by weight NH$_3$) was added to adjust the pH to 4.5 to precipitate the alumina hydrate gel. The was filtered and the filter cake washed by passing water through the filter cake. The reduction of Fe with the thiosulfate, the precipitation of the alumina with NH$_4$OH and the filtration and washing of the precipitated alumina should be carried consecutively as stated above without delay in order to avoid any substantial oxidation of the thio compounds in air.

The filter cake was dispersed in water to which NH$_4$OH was added to adjsut the pH to 10. The mixture was aged in the ammonia solution for 72 hours at 70° C. under quiescent conditions. The aged product was filtered and the filter cake washed with deionized water at room temperature until the filtrate was thiosulfate free as tested with silver nitrate solution.

The washed alumina was dried by spreading the aluminum on a tray and drying at 105° C.

The nominal analysis of alumina hydrate was 0.88% as Fe$_2$O$_3$ and 0.01% CaO, and 0.003% MgO on a volatile free basis.

The pseudoboehmite which was produced had a peptization index of 4.

A water slurry was formed containing sixteen percent (16%) of the pseudoboehmite, sixty-three and one half percent (63.5%) of ball clay, two and one half percent (2.5%) of ammonium polysilicate (expressed as the equivalent SiO$_2$, see Lim, et al., U.S. Pat. No. 4,086,187), seven percent (7%) of an ammonium and rare earth exchanged Y zeolite (of about a SiO$_2$/Al$_2$O$_3$ molar ratio of 5 which contained about 4% Na$_2$O based on the zeolite); and eleven percent (11%) of the same zeolite which has been exchanged with NH$_4$$^+$ and rare earth ion to a Na$_2$O content of about two percent (2%) (all percentages, except as indicated, on a volatile free basis on the composite catalyst). The slurry was mixed and spray dried to form "microspheres".

The catalyst had a five (5) hour attrition index of 12.4, a M activity of 76.8% and a S+ of 34. For the M and S+ activity see the Appendix.

The following Example II illustrates the improved result in the production of an alumina with reduced contaminants by the use of a more dilute solution of NH$_4$OH in the precipitation of the alumina hydrate.

EXAMPLE II

The process of Example I was followed but the NH$_4$OH solution used in the precipitation of alumina was of higher concentration (8.7% by weight as NH$_3$, instead of 4.3% as in Example I).

The washed alumina contained 1.1% Fe$_2$O$_3$; 0.01% of CaO and 0.01% MgO on a volatile free basis.

EXAMPLE III

In this example (NH$_4$)$_2$CO$_3$ was used in place of the NH$_4$OH as in Example I. The carbonate was at a concentration of 20% by weight of the carbonate solution. In all other respects, the reduction and the alumina precipitation and washing was as in Example I.

The alumina was aged as in Example I for 78 hours at 74° C. and separated by filtration.

The filter cake was washed as in Example I. The product had a peptization index of 4.

The nominal analysis of the pseudoboehmite on a volatile free basis was:

| | | |
|---|---|---|
| Fe$_2$O$_3$ | = | 0.30% |
| SO$_3$ | = | 0.69% |
| CaO | = | nil |
| MgO | = | trace |

Instead of drying the filter cake as in Example I, the wet filter cake was dispersed in the mixture of zeolite, clay and ammonium polysilicate as described in Example I, which was then milled and passed to the spray drier. The catalyst had a five (5) hour attrition index similar to that of Example I and a similar activity.

The following Example IV illustrates the effect of the pH of the leach colution whose pH has been adjusted prior to the addition of the thiosulfate.

EXAMPLE IV

The procedure of Example III was followed except that the pH of the leach solution was adjusted to a pH of 2.0 instead of 2.5 as in Example III. The resultant alumina contained 0.56% Fe$_2$O$_3$; nil CaO and 0.15% MgO. The resultant product shows a higher contamination by iron than the procedure of Example III.

However, the time required for reduction of the iron (measured by the time to attain the colorless solution) was 7 minutes in this Example IV as compared to 20 minutes in Example III.

APPENDIX

The test develops a Peptization Index (PI) as the time in minutes required for a pseudoboehmite peptized by formic acid to develop a Brookfield Viscosity of 5000 centipoises.

14.9 grams of a pseudoboehmite (on a volatile free basis) is dispersed in sufficient water to weigh 145 grams. To this water slurry is added 1.4 grams of 90% formic acid and the slurry is stirred until the vortex disappears. The slurry is then introduced promptly into a Brookfield viscosimeter and the interval of time measured until the viscosity reaches 5000 centipoises. Time is measured from the time that the formic acid is added to the slurry.

The Peptization Index of the test alumina hydrate is the number of minutes required to reach the above viscosity. (A pseudoboehmite which fails to arrive at the above viscosity in sixty minutes is unlikely to reach such viscosity at even a greatly prolonged period of time.) The alumina hydrate of our invention, which is produced by the process of our invention is characterized by a Peptization Index of sixty (60) or less than sixty (60) minutes.

The test procedure for determining the Attrition Index (AI) of spray dried microspheres of the catalyst referred to in this specification is described in Secor, et al., U.S. Pat. No. 4,010,116.

MICRO-ACTIVITY TEST

A test oil (ASTM Subcommittee D-32, Standard FHC 893) is vaporized and passed through a bed of microspheres produced by spray drying of the catalyst. Spray dried microspheres of the catalyst are of a particle size within the range of 50–70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil passed through a preheat zone and through a bed of the microspheres maintained at a temperate of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which is hydrogen, isopentane, and hexanes is determined and their weight percent of the feed determined. The weight percent of the liquid charge is determined from the following relation:

F is the weight of the oil passing through the reactor;
L is the weight of the liquid product which is collected as condensate;
R is the percent by weight of the fraction of the liquid condensate which boils above 421° F.;
H is the grams of liquid held up in the reactor exit line and around the reactor, receiver and joints.

In the above test it has been determined that it constitutes three percent of the feed F. The weight percent conversions (%C) is given by the following relationship.

$$\%C = \frac{F - \frac{R \times L}{100} - .03 F}{F} \times 100$$

The conversion using the catalyst steamed at 1450° F. is termed M conversion, the one steamed at 1500° F. is termed S conversion, and the one steamed at 1550° F. is termed S+ conversion.

We claim:

1. A method for producing pseudoboehmite from aluminum sulfate solutions containing $Fe^{+++}$, and alkaline earth ions which comprises adding a reducing agent and reducing $Fe^{+++}$ to $Fe^{++}$ without precipitating compounds of the Fe, or alkaline earth ions and then adjusting the pH in the range of about 4 to about 5 to form alumina hydrate gel without precipitating any substantial quantities of Fe or alkaline earth compounds, separating the gel from the leach solution aging the gel at a pH in excess of about 9 and forming pseudoboehmite substantially free of Fe and of alkaline earth cations.

2. A method for producing pseudoboehmite from aluminum sulfate solutions containing $Fe^{+++}$, and alkaline earth ions which comprises adding a thiosulfate to said solution and reducing $Fe^{+++}$ to $Fe^{++}$ without precipitating compounds of the Fe, or alkaline earth ions and then adjusting the pH in the range of about 4 to about 5 to form alumina hydrate gel without precipitating any substantial quantities of Fe or alkaline earth compounds, separating the gel from the leach solution aging the gel at a pH in excess of about 9 and forming pseudoboehmite substantially free of Fe and of alkaline earth cations.

3. A method for producing pseudoboehmite from aluminum sulfate solutions containing $Fe^{+++}$, and alkaline earth ions which comprises adding sodium thiosulfate to said solution at a pH in the range of about 1 to about 3, and reducing $Fe^{+++}$ to $Fe^{++}$ without precipitating compounds of the Fe, or alkaline earth ions and then adjusting the pH in the range of about 4 to about 5 to form alumina hydrate gel without precipitating any substantial quantities of Fe or alkaline earth compounds, separating the gel from the leach solution aging the gel at a pH in excess of about 9 and forming pseudoboehmite substantially free of Fe and of alkaline earth cations.

4. A method for producing pseudoboehmite from aluminum sulfate solutions containing $Fe^{+++}$, and alkaline earth ions which comprises adding sodium thiosulfate to said solution at a pH in the range of about 1 to about 3, in amount equivalent to more than about 2 moles of said thiosulfate per gram atom of Fe, and reducing $Fe^{+++}$ to $Fe^{++}$ without precipitating compounds of the Fe, or alkaline earth ions and then adjusting the pH in the range of about 4 to about 5 to form alumina hydrate gel without precipitating any substantial quantities of Fe or alkaline earth compounds, separating the gel from the leach solution aging the gel at a pH in excess of about 9 and forming pseudoboehmite substantially free of Fe and of alkaline earth cations.

5. The process of claim 1, 2, 3 or 4, in which the gel is formed at a pH in the range of about 4 to about 5 by addition of a solution of $NH_4OH$ containing less than about 10% by weight of $NH_3$ in the solution.

6. The process of claim 1, 2, 3 or 4, in which the gel is formed at a pH in the range of about 4 to about 5 by the addition of a solution $(NH_4)_2CO_3$ containing less than about 20% by weight of the $(NH_4)_2CO_3$.

7. The process of claim 1, 2, 3 or 4, in which the gel is formed at a pH in the range of about 4 to about 5 by addition of a solution of NaOH containing less than about 20% by weight of the NaOH.

* * * * *